May 10, 1932.  E. F. NEWCOME  1,857,255
INDICATOR
Filed July 24, 1931
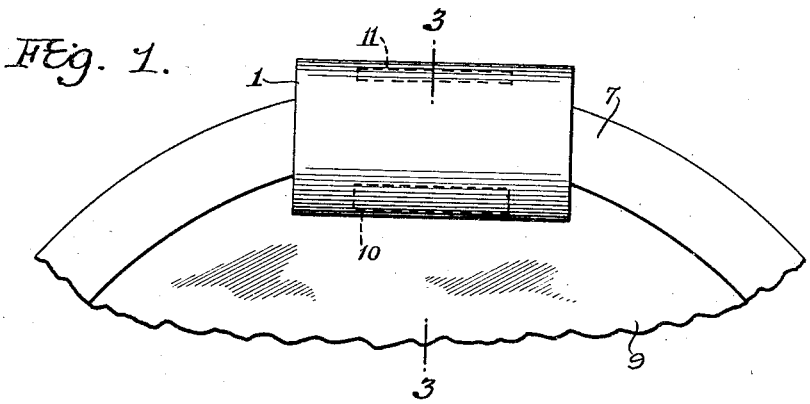
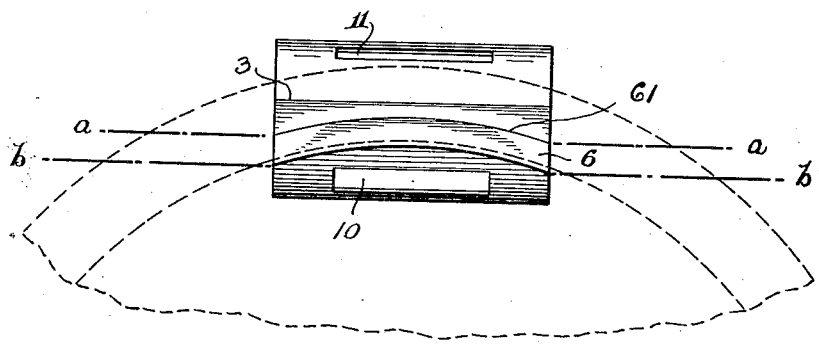
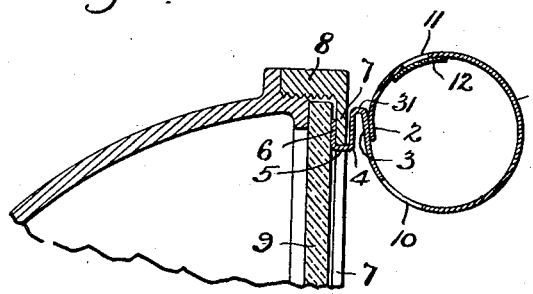
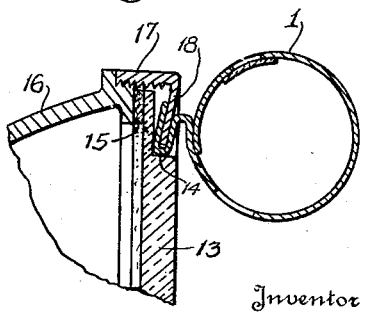
Inventor
E. F. NEWCOME
By Mason Fenwick Lawrence
Attorney Patented May 10, 1932

1,857,255

UNITED STATES PATENT OFFICE

EDWARD F. NEWCOME, OF MIAMI, FLORIDA

INDICATOR

Application filed July 24, 1931. Serial No. 552,963.

The invention forming the subject matter of this application is an indicator adapted to be applied to the headlights of automobiles and similar vehicles for the purpose of indicating to the driver, located in the usual driving position, whether or not each of the headlights is in operation.

The main object of the invention is to provide a simple form of indicator which can be very readily attached to any headlight of a vehicle without the use of tools, and without in any way mutilating the headlight or any part thereof.

Another object of the invention is to provide an indicator of this type which can be cheaply manufactured and in which the parts are readily accessible for the purpose of cleaning the same.

Other objects of the invention will become apparent as the detailed description thereof proceeds.

In the drawings:

Figure 1 is a front elevation of the invention as applied to the upper part of an automobile headlight;

Figure 2 is a rear elevation of the invention detached from the headlight;

Figure 3 is a vertical transverse section through the upper part of a headlight to which the invention is shown attached; and Figure 4 is a vertical transverse section through the upper part of a headlight in common use, but different in construction from that illustrated in Figure 3.

As shown particularly in Figures 2 and 3, the invention comprises a thin sheet 1 of aluminum or other suitable material adapted to reflect light. This sheet of material is bent to form a cylinder and a part 3 thereof is extended past the joint 2 which completes the cylinder. The part 3 is bent to form a straight edge bend 31 which is parallel to the axis of the cylinder, and to form a downwardly extending part 4 which is then bent to form a bend 5 and an upwardly extending leaf 6.

The leaf 6 is adapted to be frictionally clamped between the arcuate rim 7 of the clamping ring 8 and lens 9 of a headlight of common construction. The upper edge 61 of the leaf 6 may be shaped arcuately, as shown in Figure 2, to fit the circular part of the ring 8 although this is not necessary. The bend 5, where the leaf 6 joins the downwardly extending part 4, may also be shaped arcuately, as shown in Figure 2, to fit the inner edge of the aforesaid rim. However, this is not necessary, because the indicator is so small that the chords $a$—$a$ and $b$—$b$ formed by substituting straight edges for the arcuate edges of the leaf 6 or the bend 5 are so small that the straight edged indicators can be just as securely held as the type shown in Figure 2.

It is preferable that all the bends and joints of this indicator be straight, because the device can then be stamped out from a single sheet of material, having nothing but straight edged bends therein requiring no metal to be drawn in a die. The rear lower quarter of the cylinder 1 is provided with a slot 10 extending lengthwise of the cylinder to permit the rays of light from the headlight to pass through said slot and impinge against the inside of the front wall of cylinder 1. The upper rear quarter of the cylinder 1 is also provided with a narrow indicator slot 11 extending lengthwise of the cylinder, and preferably covered by a strip of red celluloid 12 or other similar material which will give a decided and clear cut colored image of the slot 11, visible to the driver when seated in ordinary driving position. The rays of light from the headlight are reflected from the front inner surface of the cylinder 1 and through the colored strip 12 to the driver's position.

The cylinder is open at both ends to facilitate cleaning whenever necessary; and, also to reduce the expense of manufacturing the indicator.

It will be evident from the disclosure that the indicator can be cheaply manufactured by stamping it out of a single sheet of material in which all the joints and light admitting and emitting slots are defined by straight lines. It will also be evident that this indicator can be applied to any headlight by merely forcing the leaf 6 between the rim of the clamping ring of the headlight and the lens of the same. This material of which the indicator is made will preferably be so thin as to obviate the necessity of loosening the headlight ring to insert the leaf 6.

This invention is shown in the form in which it is most readily adapted for manufacturing cheaply and on a large scale. It is contemplated, however, that it may be made arcuate in elevation to conform generally to the elevation curvature of the headlight.

The invention may be readily applied to a headlight of the type illustrated in Figure 4, in which the lens 13 is shown provided with an annular rabbet 14, the back of which is clamped against an annular gasket 15. An annular flange formed on the body 16 of this headlight receives the gasket 15, and the edge of the body 16 is externally screw-threaded to receive the internally threaded rim 17 of a clamping ring 18.

In this modified form of the invention the bend 5 of the indicator seats in the corner of rabbet 14, and is therefore positively held in position on the headlight by ring 18.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claim.

What I claim is:

A reflecting attachment for head lights of automobiles, comprising an open ended cylinder adapted to be attached to a headlight with its axis horizontal and transverse to the axis of the head light, said cylinder being formed of sheet metal having a light reflecting inner cylindrical surface, and having a part projecting beyond the line of junction, said part being bent outwardly radially of said cylinder and then bent upon itself to form an attachment lug substantially parallel with the axis of the cylinder, said cylinder having slots formed therein parallel with the axis of the cylinder and having one of said slots on each side of said attachment lug for the purpose specified.

In testimony whereof I affix my signature.

EDWARD F. NEWCOME.